(12) United States Patent
Greco et al.

(10) Patent No.: US 7,903,812 B2
(45) Date of Patent: Mar. 8, 2011

(54) DETECTION AND HANDLING OF ENCRYPTION KEY AND INITIALIZATION VECTOR

(75) Inventors: Paul Merrill Greco, Tucson, AZ (US); Melanie Jean Sandberg, Tucson, AZ (US); Scott Jeffrey Schaffer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/530,010

(22) Filed: Sep. 7, 2006

(65) Prior Publication Data

US 2008/0063186 A1  Mar. 13, 2008

(51) Int. Cl.
*H04L 9/00* (2006.01)
(52) U.S. Cl. .......................................... 380/28; 380/201
(58) Field of Classification Search .................. 380/277, 380/201, 28; 713/193; 365/222
See application file for complete search history.

(56) References Cited

U.S. PATENT DOCUMENTS

| | | | |
|---|---|---|---|
| 6,023,643 | A | 2/2000 | Jesionowski |
| 6,295,361 | B1 | 9/2001 | Kadansky et al. |
| 6,567,914 | B1 | 5/2003 | Just et al. |
| 6,915,434 | B1 | 7/2005 | Kuroda et al. |
| 6,918,040 | B2 | 7/2005 | Ries et al. |
| 6,950,522 | B1 | 9/2005 | Mitchell et al. |
| 7,013,389 | B1 | 3/2006 | Srivastava et al. |
| 2002/0164035 | A1 | 11/2002 | Yokota et al. |
| 2003/0021418 | A1* | 1/2003 | Arakawa et al. ............. 380/277 |
| 2003/0081787 | A1 | 5/2003 | Kallahalla et al. |
| 2003/0099362 | A1 | 5/2003 | Rollins |
| 2005/0071591 | A1 | 3/2005 | Goodman et al. |
| 2005/0086471 | A1 | 4/2005 | Spencer |
| 2005/0089165 | A1* | 4/2005 | Kitani et al. .................. 380/201 |
| 2005/0138403 | A1* | 6/2005 | Volp et al. ..................... 713/193 |
| 2005/0174869 | A1* | 8/2005 | Kottomtharayil et al. .... 365/222 |

(Continued)

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, by inventors B. G. Goodman, J.A. Fisher, and L.G. Jesionowski.

(Continued)

*Primary Examiner* — Vivek Srivastava
*Assistant Examiner* — Thong Truong
(74) *Attorney, Agent, or Firm* — Rabindranath Dutta; Konrad Raynes & Victor LLP

(57) ABSTRACT

Provided are a method, system, and article of manufacture that maintains, at a decryption unit, and expected key identifier and an expected initialization vector. A key identifier and an initialization vector are received at the decryption unit, wherein a plurality of encrypted data records are preceded by the key identifier and the initialization vector in a data stream, and wherein the plurality of encrypted data records have been encrypted with a cryptographic key that is recoverable by the decryption unit from the key identifier. An initiation is made of the reading of the plurality of encrypted data records of the data stream, in response to determining at the decryption unit that the received key identifier matches the expected key identifier. Certain embodiments are implemented in a storage library, comprising at least one storage drive, and at least one decryption unit included in the at least one storage drive, wherein in certain embodiments the storage library is a tape library. Certain additional embodiments are implemented in a storage drive, comprising a removable storage medium and at least one decryption unit coupled to the removable storage medium, wherein in certain embodiments the storage drive is a tape drive.

20 Claims, 7 Drawing Sheets

U.S. PATENT DOCUMENTS

| | | |
|---|---|---|
| 2005/0204161 A1 | 9/2005 | Caronni |
| 2005/0207570 A1 | 9/2005 | Yamamoto et al. |
| 2005/0226423 A1 | 10/2005 | Li et al. |
| 2006/0062383 A1 | 3/2006 | Kaneda et al. |

OTHER PUBLICATIONS

Advanced Encryption Standard (AES), Federal Information Processing Standards Publication 197, Nov. 26, 2001, pp. 1-51.

"IBM TotalStorage Enterprise Tape System 3592—SCSI Reference" IBM Corporation, Document No. GA32-0466-02, Oct. 2005.

D.A. McGrew, et al., "The Galois/Counter Mode of Operation (GCM)", May 31, 2005, pp. 1-44.

"IEEE P1619.1/D8 Draft Standard Architecture for Encrypted Variable Block Storage Media", IEEE, 2006, pp. 1-26.

U.S. Patent Application entitled "Configuring a Storage Drive to Communicate With Encryption and Key Managers", U.S. Appl. No. 11/530,022, filed Sep. 7, 2006, by inventors B.G. Goodman, G.A. Jaquette, L.G. Jesionowski and P.M. Greco.

U.S. Patent Application entitled "Keyless Encrypted Data", U.S. Appl. No. 11/530,008, filed Sep. 7, 2006, by inventors P.M. Greco and G.A. Jaquette.

U.S. Patent Application entitled "Key Generation and Retrieval Using Key Servers", U.S. Appl. No. 11/530,006, filed Sep. 7, 2006, by inventors P.M. Greco, .TJ. Hahn and G.A. Jaquette.

U.S. Patent Application entitled "Maintaining Encryption Key Integrity", U.S. Appl. No. 11/530,012, filed Sep. 7, 2006, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, by inventors P.M. Greco, G.A. Jaquette, and W.E. Rhoten.

U.S. Patent Application entitled "Recovering Remnant Encrypted Data on a Removable Storage Media", U.S. Appl. No. 11/530,021, filed Sep. 7, 2006, by inventors E.M. Dawson, P.M. Greco, G.A. Jaquette and J.M. Karp.

U.S. Patent Application entitled "Verification of Encryption Key", U.S. Appl. No. 11/530,009, filed Sep. 7, 2006, by inventors P.M. Greco, S. Halevi and G.A. Jaquette.

U.S. Patent Application entitled "Automatically Filling a Drive Table", U.S. Appl. No. 11/530,013, filed Sep. 7, 2006, by inventors T.J. Hahn and G.A. Jaquette.

U.S. Patent Application entitled "Validating an Encryption Key File on Removable Storage Media", U.S. Appl. No. 11/530,019, filed Sep. 7, 2006, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, by inventors B.G. Goodman and L.G. Jesionowski.

U.S. Patent Application entitled "Secure Transmission of Cryptographic Key", U.S. Appl. No. 11/530,014, filed Sep. 7, 2006, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, by inventors P.M. Greco, S. Halevi, and G.A. Jaquette.

\* cited by examiner

US 7,903,812 B2

DETECTION AND HANDLING OF ENCRYPTION KEY AND INITIALIZATION VECTOR

BACKGROUND

1. Field

The disclosure relates to a method, system, and article of manufacture for the detection and handling of encryption key and initialization vector.

2. Background

The Advanced Encryption Standard (AES) is a cryptographic mechanism that can be used to protect electronic data. The AES uses a symmetric block cipher that can encrypt and decrypt data. Encryption can convert data to an unintelligible form called encrypted data, and decrypting the encrypted data converts the data back into its original form. The AES algorithm is capable of using cryptographic keys of 128, 192, and 256 bits to encrypt and decrypt data in blocks of 128 bits. Further details of the AES may be found in the publication, "Specification for the Advanced Encryption Standard (AES)," Federal information Processing Standards Publication 197, Nov. 26, 2001.

To further address the issues of electronic data storage protection, the "IEEE Std 1619.1" standard provides mechanisms for data protection by specifying encryption with authentication and length-expansion. The IEEE Std 1619.1 standard provides methods suitable for ensuring the privacy and integrity of stored data within applications requiring a high level of assurance. To this end, the IEEE Std 1619.1 standard specifies the AES cipher as used in the Galois/counter mode (GCM) of authentication and encryption of data. Further details of the IEEE Std 1619.1 standard may be found in the publication, "IEEE P1619.1™/D8 Draft Standard Architecture for Encrypted Variable Block Storage Media," Institute of Electrical and Electronics Engineers, Inc., June 2006. Further details of GCM may be found in the publication, "The Galois/Counter Mode of Operation (GCM)" by David A. McGrew and John Viega, May 31, 2005.

A cryptographic module that supports GCM may use the GCM algorithm that uses AES with a 256-bit key, and such an algorithm may be referred to as "AES-256-GCM". The AES-256-GCM uses key identifiers that can be used by certain decryptors to determine cryptographic keys. The AES-256-GCM also uses initialization vectors (IV), where counter values determined from initialization vectors may be used in combination with cryptographic keys to encrypt and decrypt data.

SUMMARY OF THE DESCRIBED EMBODIMENTS

Provided are a method, system, and article of manufacture that maintains, at a decryption unit, an expected key identifier and an expected initialization vector. A key identifier and an initialization vector are received at the decryption unit, wherein a plurality of encrypted data records are preceded by the key identifier and the initialization vector in a data stream, and wherein the plurality of encrypted data records have been encrypted with a cryptographic key that is recoverable by the decryption unit from the key identifier. An initiation is made of the reading of the plurality of encrypted data records of the data stream, in response to determining at the decryption unit that the received key identifier matches the expected key identifier.

In further embodiments, the reading of the plurality of encrypted data records of the data stream is delayed by the decryption unit, if the received key identifier does not match the expected key identifier at the decryption unit.

In yet further embodiments, a replacement is made at the decryption unit of the expected key identifier with a new expected key identifier, in response to determining that the received key identifier does not match the expected key identifier. A determination is made at the decryption unit as to whether the new expected key identifier matches the received key identifier.

In additional embodiments, a first encrypted data record of the plurality of encrypted data records is read. The first encrypted data record of the plurality of encrypted data records is decrypted by using a counter value generated from the initialization vector and the cryptographic key recovered from the expected key identifier. Additional encrypted data records of the plurality of encrypted data records for decryption are read.

In certain embodiments, for initiating the reading of the plurality of encrypted data records of the data stream both the received key identifier and the received initialization vector have to match the expected initialization vector and the received initialization vector at least at a plurality of bits indicated in a mask register.

Certain embodiments are implemented in a storage library, comprising at least one storage drive, and at least one decryption unit included in the at least one storage drive. In certain embodiments the storage library is a tape library. Certain additional embodiments are implemented in a storage drive, comprising a removable storage medium and at least one decryption unit coupled to the removable storage medium. In certain embodiments, the storage drive is a tape drive.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Encryption may be used for protecting data records. For encryption to be useful, customers should be able to decrypt and read back the encrypted data records. In certain encryption/decryption methodologies, such as in AES-256-GCM, correctly decrypting an encrypted data record requires possession of the right cryptographic key and the right initialization vector. Without the possession of the right cryptographic key and the right initialization vector, decryption of the encrypted data record is not possible.

Certain solutions may attempt to determine whether decryption is being performed with the correct values of the cryptographic key and the initialization vector. One such solution may read the data records of a data stream and the message authentication code (MAC) that is appended at the end of the data records of the data stream, where the message authentication code may be used to determine data integrity. Such a solution may determine from the message authentication code, whether there is a message authentication code failure, and if there is a message authentication failure then the decryption of the data records may not have not been performed correctly. However, such a solution requires all data records of a data stream to be read before determining that an error. Additionally, after determining an error, a user would have to backtrack and read the data records of the data stream once again and use the correct key and initialization vector to decrypt the data records.

Certain embodiments check for the correct cryptographic key and initialization vector before the decryption of the data records of a data stream. In such embodiments, the key identifier corresponding to the cryptographic key and the initialization vector value that are prefixed before the data records of a data stream are compared against an expected key identifier value and an initialization vector value stored in registers of a decryption unit. If the expected key identifier matches the key identifier received from the data stream then the reading of the data records of the data stream for decryption can begin. Otherwise the reading of the data records of the data stream is stalled until a matching value for the key identifier is provided.

Exemplary Embodiments

Figure 1:
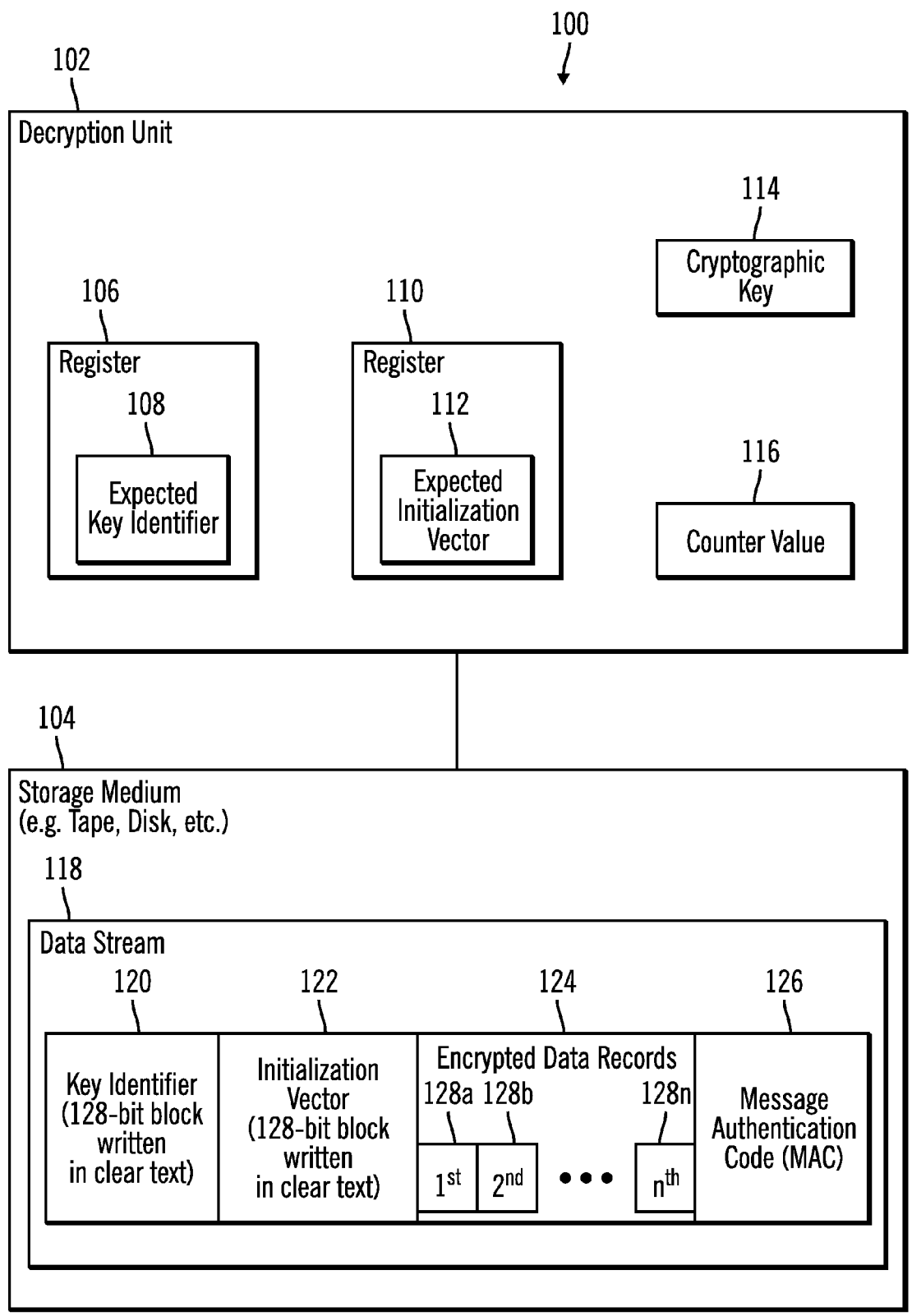
FIG. 1 illustrates a block diagram of a computing environment in accordance with certain embodiments.

FIG. 1 illustrates a block diagram of a computing environment 100 in accordance with certain embodiments. The computing environment 100 includes at least one decryption unit 102 that may be coupled to a storage medium 104 over a network. The decryption unit 102 may comprise a specialized hardware decryption unit, with one or more processors, memory, registers, and so on. In certain embodiments, the decryption unit 102 may comprise a computational device. In other embodiments, the decryption unit 102 may be included in any suitable computational platform, including those presently known in the art, such as, a personal computer, a workstation, a mainframe, a midrange computer, a network appliance, a palm top computer, a telephony device, a blade computer, a hand held computer, etc. In still further embodiments, the decryption unit 102 may be implemented in software, hardware, firmware, or any combination thereof, inside or outside of a computational platform.

The decryption unit 102 includes a first register 106 that stores an expected key identifier 108, a second register 110 that stores an expected initialization vector 112, and data structures or hardware units for indicating a cryptographic key 114 and a counter value 116.

The expected key identifier 108 is a clear text value that can be used by the decryption unit 102 to determine the cryptographic key 114 that has been used for encryption. For example, in certain embodiments the expected key identifier 108 is a pointer to the cryptographic key 114. In other embodiments the expected key identifier 108 can be used to determine the location of the cryptographic key 114. In still further embodiments, the expected key identifier 108 can be used to determine the cryptographic key 114 via other mechanisms.

The expected initialization vector 112 can be used to determine a counter value 116 where the counter value 116 in combination with the cryptographic key 114 may be used to decrypt data records in accordance with AES-256-GCM or other mechanisms. The counter value 116 can change during decryption of each of a plurality of data records even though the expected initialization vector 112 remains the same.

The expected key identifier 108 and the expected initialization vector 112 may have been set in the decryption unit 102 by an application, a user, or as a result of a previous reading of a data stream that provided the expected key identifier 108 and the expected initialization vector 112 to the decryption unit 102.

The storage medium 104 may comprise one of more tapes, disks, or any other suitable storage medium known in the art. The storage medium 104 may be included in a storage device (not shown) and the decryption unit 102 may read a data stream 118 stored in the storage medium 104 of the storage device.

The data stream 118 is comprised of a key identifier 120, an initialization vector 122, a plurality of encrypted data records 124 and a message authentication cod 126. The key identifier 120 may be written in clear text on a first 128-bit block of the data stream 118. The key identifier 120 may be followed by the initialization vector 122 that may be written in clear text on a second 128-bit block of the data stream 118.

The encrypted data records 124 follow the initialization vector 122 in the data stream 118. The encrypted data records 124 may in certain embodiments comprise several megabytes of data or more, and may be comprised of a sequence of data records 128a, 128b, . . . 128n. The encrypted data records 124 may have been encrypted by using the cryptographic key corresponding to the key identifier 120 and by using counter values derived from the initialization vector 122.

The message authentication code 126 that follows the encrypted data records 124 may be used for determining the integrity of the data of the data stream 118.

In certain embodiments illustrated in FIG. 1, before a read operation of the data stream 118 begins, expected values for the key identifier 120 and the initialization vector 122 have already been written into the registers 106 and 110 in the decryption unit 102. When a data stream is read, only the first two 128-bit blocks (the key identifier 120 and the initialization vector 122) are read initially and the pipeline for reading the data stream 118 is stalled. The expected key identifier 108 stored in the register 106 is compared against the key identifier 120 read from the storage medium 104. If the expected key identifier 108 matches with the key identifier 120 read from the storage medium 104, then the read process resumes with the reading of the encrypted data records 124 and the encrypted data records 124 are decrypted. If the expected key identifier 108 does not match with the key identifier 120 read from the storage medium 104, then the read process is stalled.

Figure 2:
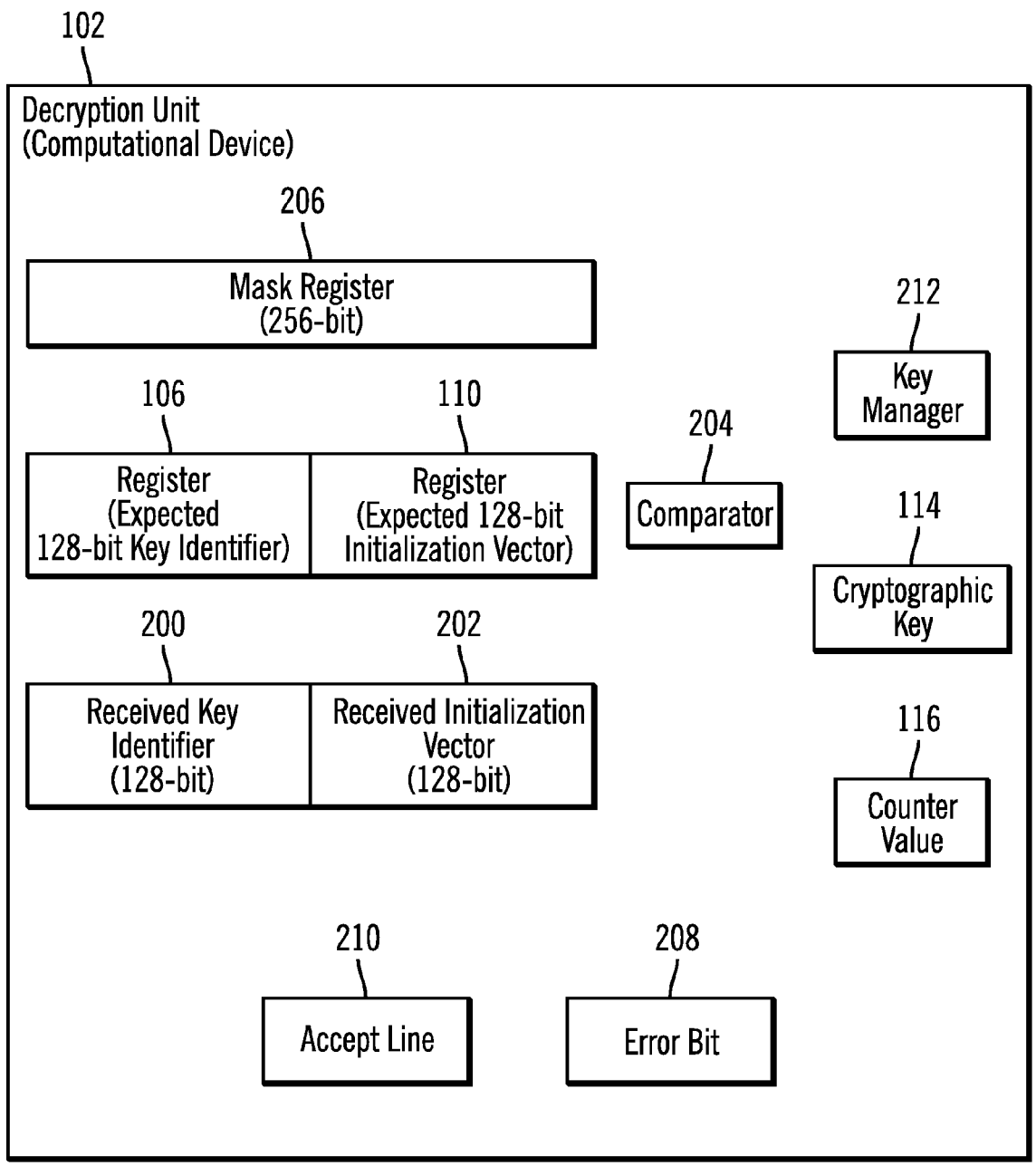
FIG. 2 illustrates a block diagram of a decryption unit, in accordance with certain embodiments.

FIG. 2 illustrates a block diagram of the decryption unit 102 implemented in the computing environment 100, in accordance with certain embodiments. Additional elements beyond those indicated in FIG. 1 for the decryption unit 102 may be found in FIG. 2.

In certain embodiments illustrated in FIG. 2, before a read operation of the data records 124 begins, expected values for the 128-bit key identifier and 128-bit initialization vector are written into registers 106 and 110 respectively. When a data stream 118 is being read from the storage medium 104, only the first two 128-bit blocks (the key identifier 120 and the initialization vector 122) are read initially and the pipeline for reading the data records 124 of the data stream 118 is stalled. These two blocks 120, 122 were written in the clear so no decryption is necessary. The two blocks 120, 122 are stored in the decryption unit 102 as the received key identifier 200 and the received initialization vector 202, and these two blocks 200, 202 are compared bit by bit by one or more comparators 204 against the values in the registers 106, 110 through a 256-bit mask stored in a 256-bit mask register 206. The 256-bit mask register can be written such that the comparison does not have to be performed against the full 256 bits. For example, in certain embodiments only the expected key identifier 108 may be compared to the key identifier 120 included in the data stream 118. The accept line 210 of the decryption unit 102 is turned off until a valid match is obtained. At this point in time, no encrypted data record 124 has actually been sent to the decryption unit 102.

If the values stored in registers 106, 110 match with the received key identifier 200 and the received initialization vector 202, then the reading of the data stream 118 continues. If the values stored in registers 106, 110 do not match with the received key identifier 200 and the received initialization vector 202, then the pipeline is stalled and the error bit 208 is set. The decryption unit 102 detects the error bit 208, reads the registers 200, 202 that contain the actual values read from the storage medium 104, and passes those values to the key manager 212 for further processing.

To restart the read operation the expected and actual key identifiers and initialization vectors may have to match. The decryption unit 102 rewrites the expected values in registers 106, 110 and signals the decryption unit 102 to start another comparison. At this point the error bit 208 has turned off, but the error bit 208 will be set again if there is still a comparison failure. Assuming the data matches this time, the accept line 210 will be turned on and data records 124 for decryption will be received by the decryption unit 102.

Therefore, FIG. 2 illustrates certain embodiments in which the decryption unit 102 checks for unexpected keys and initialization vectors by comparing the actual values read from a storage medium 104 with the expected values stored in the decryption unit 102.

Figure 3:
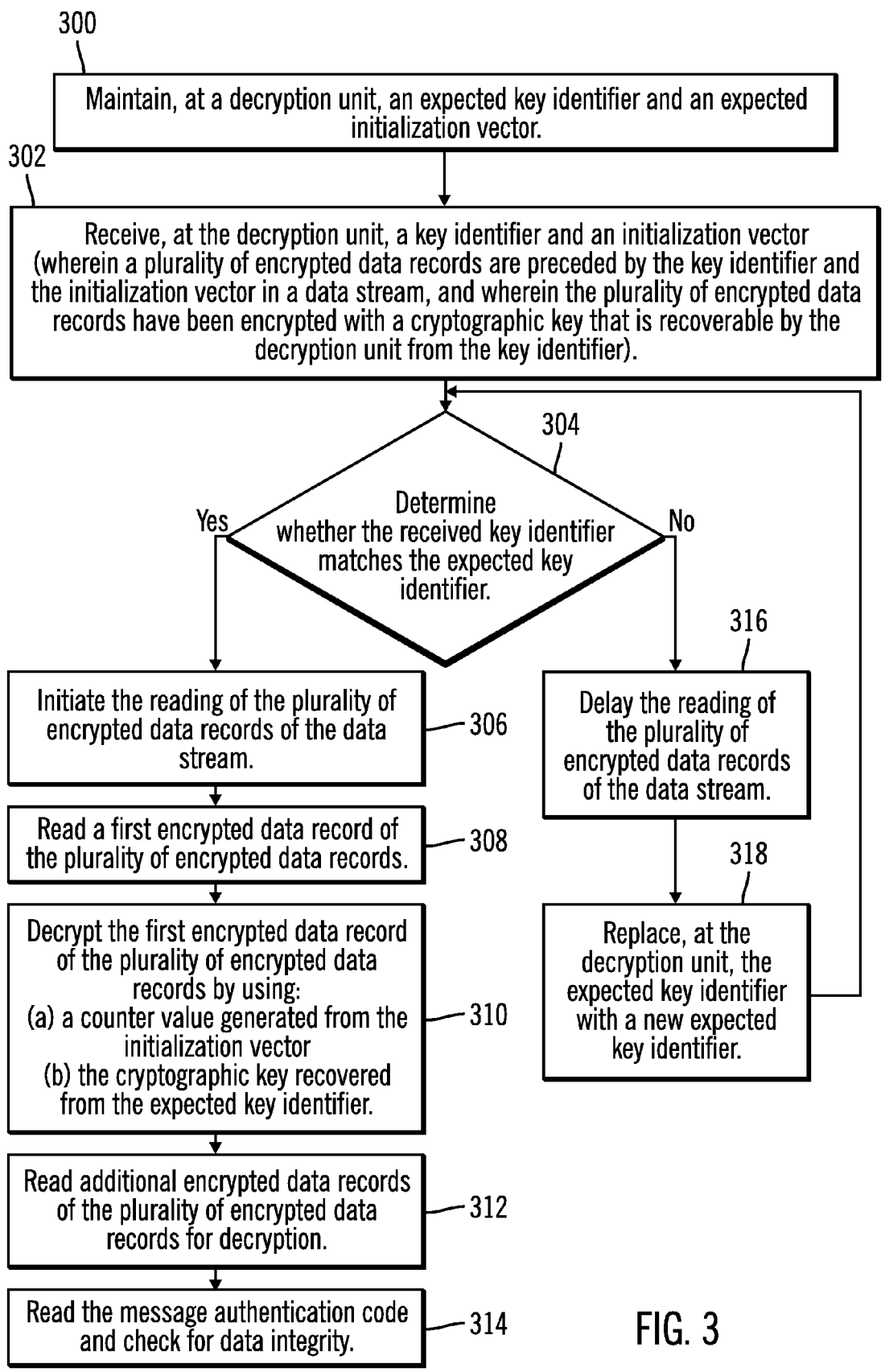
FIG. 3 illustrates a flowchart that shows operations for the detection and handling of encryption key and initialization vector, in accordance with certain embodiments.

FIG. 3 illustrates a flowchart that shows operations for the detection and handling of encryption key and initialization vector, in accordance with certain embodiments. The operations may be performed in the decryption unit 102 of the computing environment 100.

Control starts at block 300, where an expected key identifier 108 and an expected initialization vector 112 is maintained in a decryption unit 102. A key identifier 120 and an initialization vector 122 are received (at block 302) at the decryption unit 102, wherein a plurality of encrypted data records 124 are preceded by the key identifier 120 and the initialization vector 122 in a data stream 118, and wherein the plurality of encrypted data records 124 have been encrypted with a cryptographic key that is recoverable by the decryption unit 102 from the key identifier 120.

Control proceeds to block 304 where the decryption unit 102 determines whether the received key identifier 200 matches the expected key identifier 108. If the decryption unit 102 determines that the received key identifier 200 matches the expected key identifier 108 (stored in register 106) then the decryption unit 102 initiates (at block 306) the reading of the plurality of encrypted data records 124 of the data stream 118.

The decryption unit 102 reads (at block 308) a first encrypted data record 128a of the plurality of encrypted data records 128a . . . 128n. The decryption unit 102 decrypts (at block 310) the first encrypted data record 128a of the plurality of encrypted data records 128a . . . 128n by using a counter value 116 generated from the initialization victor 122 and the cryptographic key 114 recovered from the expected key identifier 108. Additional encrypted data records of the plurality of encrypted data records 124 are read (at block 312) for decryption. The message authentication code 126 is read (at block 314) and a check is made for data integrity.

If the decryption unit 102 determines (at block 304) that the received key identifier 200 does not match the expected key identifier 108 then the decryption unit 102 delays (at block 316) the reading of the plurality of encrypted data records 124 of the data stream 118. A replacement is made (at block 318), at the decryption unit 102, of the expected key identifier 108 with a new expected key identifier and control returns to block 304, where a determination is made as to whether the received key identifier matches the new expected key identifier.

Therefore, FIG. 3 illustrates certain embodiments in which a decryption unit 102 avoids decrypting encrypted data records 124 unless the key identifier 120 stored at the beginning a data stream matches an expected key identifier 108 stored in the decryption unit 102. Since decryption of encrypted data is time consuming when compared to the comparison of the key identifier 120 with the expected key identifier 108, the avoidance of backtracking across a sequence of encrypted data records 124 of a data stream 118 in the event of an error results in a faster processing time for decrypting encrypted data.

Storage Library and Storage Device Related Embodiments

Figure 4:
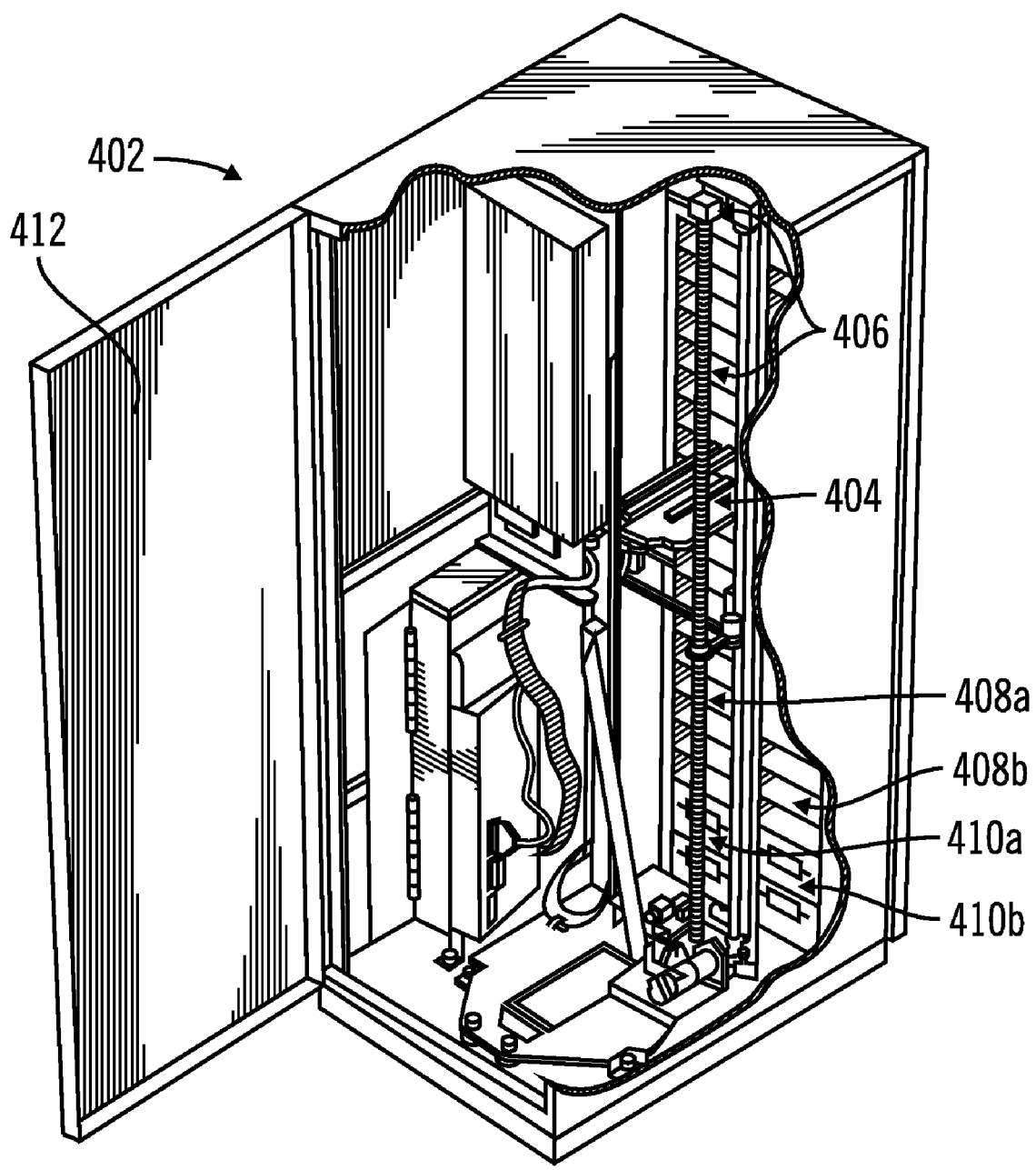
FIG. 4 illustrates an embodiment of a storage library, in accordance with certain embodiments.
Figure 5:
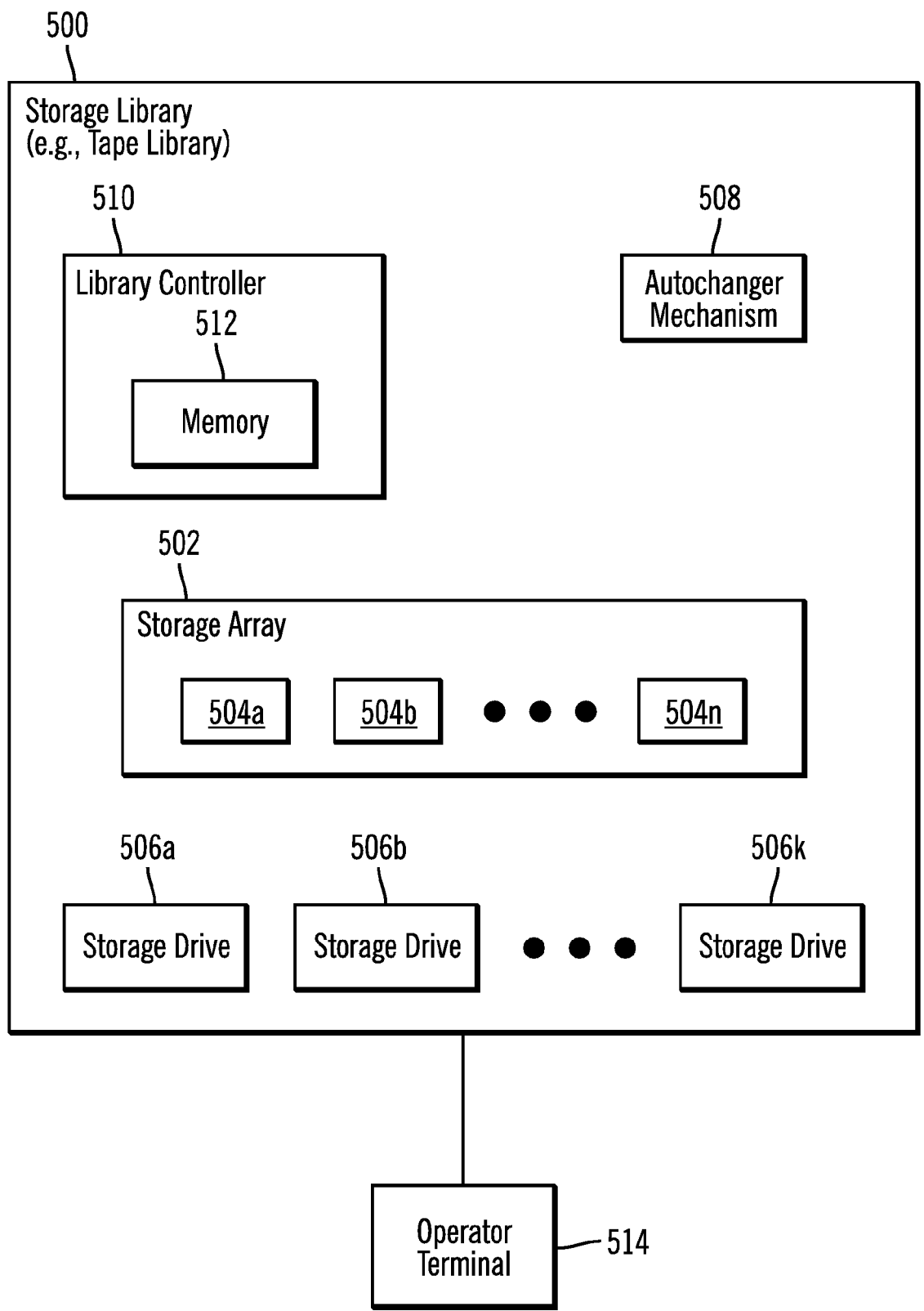
FIG. 5 illustrates an embodiment of components in a storage library, in accordance with certain embodiments.
Figure 6:
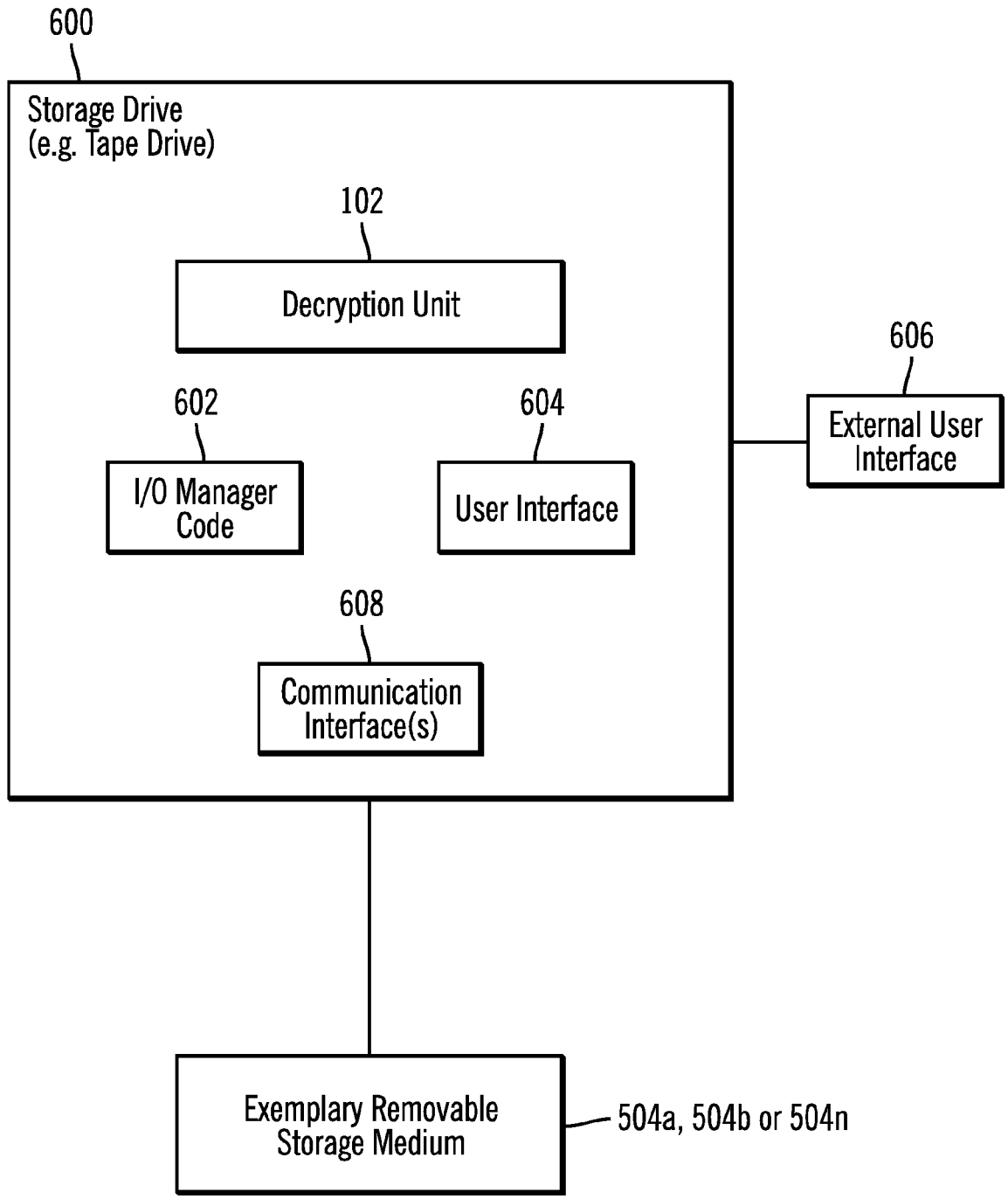
FIG. 6 illustrates an embodiment of components of a storage drive capable of interfacing with a removable storage media, in accordance with certain embodiments.

FIGS. 1-3 have described certain embodiments which illustrate certain interactions of a decryption unit 102 with a storage medium 104. FIGS. 4-6 illustrate certain additional embodiments in which the decryption unit 102 and the storage medium 104 are included a storage device, such as a tape drive, wherein in certain embodiments one or more storage devices may be implemented in a storage library.

FIG. 4 illustrates a storage library, such as an automated tape library 402, known in the prior art. The tape library 402 includes a library controller, an input/output station, a picker assembly 404, a carriage assembly 406, storage cells 408a, 408b, and optical disk drives (not shown). The term "library element" as used herein refers to any slot in the automated tape library 402 in which storage cartridges may be disposed, e.g., the input/output stations, the storage cells 408a, 408b, etc. The library controller includes a processor, RAM, and other controls and interfaces to direct the actions of the library components. The library controller further interacts with a host processor to respond to library commands transmitted from the host processor. The input/output station is the opening through which the user may insert or remove a cartridge. An operator panel on the outside of the box housing the tape library 402 allows the user to communicate with the library controller. When adding a cartridge through the input/output slot, the user may indicate the addition of a cartridge using the operator panel. The tape library 402 also includes an access door 412 through which the user may add or remove cartridges maintained in the storage cells 408a, 408b.

The tape library 402 has two columns of storage cells 408a, 408b and storage drives 410a, 410b that perform read and write operations with respect to the storage media cartridges. A picker assembly 404 is capable of manipulating the storage media cartridges in the library elements. A carriage assembly 406 moves the picker assembly 404, and any media storage cartridge held by the picker assembly 404, among the library elements. The carriage assembly 406 transports the picker assembly 404 to a destination library element. The picker assembly 404 can rotate to turn the storage media cartridge over. The picker assembly 404 has a finger mechanism to remove or insert a storage media cartridge to a library element. Once inserted in the storage drive 410a, 410b, data can be read from the storage media cartridge and sent to a host processor. Data transmitted from the host processor can be written to the storage media cartridge inserted in a storage drive 410a, 410b. One or more of the storage cells 408a, 408b in each column may comprise an Input/Output slot through which a user may remove a storage media cartridge from the tape library 402 or can insert a storage media cartridge into the tape library 402.

In further embodiments, the tape library 402 may include distributed computing components, such as distributed controller, distributed storage cells and distributed picker assemblies. Yet further, the tape library 402 may be partitioned into one or more logical libraries having multiple storage drives. Each storage drive may be configured independently of any other drive. In addition, groups of storage drives may be configured at the same time or with the same settings. This may include all storage drives in a frame, all storage drives in a logical library, all storage drives in a physical library, or all storage drives selected from a list.

FIG. 5 illustrates an embodiment of an automated storage library 500 including a storage array 502, such as the storage cells 408a, 408b (FIG. 4), including removable storage media 504a, 504b, . . . 504n; storage drives 506a, 506b, . . . 506k, such as a tape drive, optical disk drive or other interface to which a removable storage media is coupled to for access; an autochanger mechanism 508 to transfer removable storage media 504a . . . 504n between the storage array 502 and storage drive 506a . . . 506k, such as the picker assembly 404 (FIG. 4); and a library controller 510.

The removable storage media 504a . . . 504n may comprise any type of media on which data may be stored and which may serve as removable media, including but not limited to magnetic media (such as magnetic tape or disks), optical media (such a optical tape or disks), electronic media (such as PROM, EEPROM, flash PROM, MRAM, etc.), or other suitable media. In certain embodiments, the removable storage media has a cartridge housing, such as the case with a magnetic tape cartridge or a removable disk drive.

In certain embodiments, the library controller 510 is comprised of a microprocessor and various controls and interfaces to control the operation of the components in the automated library 500, including the autochanger mechanism 508 and storage drives 506a . . . 506k. The library controller 510 utilizes a memory 512 to store various information, such as a storage media map maintaining information on the location of removable storage media 504a . . . 504n in the library 500, including the content of the library elements in the storage array 502. The library controller 510 may comprise a single processing unit or distributed processing units.

The library controller 510 may further manage read/write operations with respect to removable storage media 504a . . . 504n in the storage library 500. A library operator may directly control operations and the management of removable storage media 504a . . . 504n through an operator terminal 514 coupled to the library 500, comprising of a display device and keyboard, to interface with the library controller 510. Additionally, a host system (not shown) may send commands to the library controller 510 to control operations within the automated library 500 or perform read or write operations on volumes within removable storage media 504a . . . 504n managed by the library 500, where the host system may communicate with the library 500 over a network or through a direct cable connection.

FIG. 6 illustrates an embodiment of a storage drive 600 that is capable of performing I/O operations with respect to a coupled exemplary removable storage media 504a, 504b, or 504n that are capable of being inserted into the storage drive 600. The storage drive 600 includes I/O manager code 602 to perform read/write operations with respect to a coupled removable storage media 504a, 504b, or 504n. The storage drive 600 includes a user interface 604 comprising user controls on the storage drive 600 housing to configure and control the storage drive 600. Further, in certain embodiments, an external user interface 606 may optionally be coupled to the storage drive 600 providing additional user controls used to configure and control the storage drive 600. The storage drive 600 may further include one or more communication interfaces 608, and the decryption unit 102 (shown in FIG. 1), and in certain embodiments the storage medium 104 (shown in FIG. 1) may be included in the storage driver 600 and correspond to one of the removable storage media 504a, 504b or 504n.

The user interface 604 and optional external user interface 606 may include user interface elements for interacting with the storage drives 506a . . . 506k, such as an eject button for manually unloading removable storage media 504a, 504b or 504n, up/down buttons for navigating a list of items, enter/exit buttons for selecting items or exiting from a menu or list, and one or more status displays (e.g., a light or LED (Light Emitting Diode), a numeric display, and alphanumeric display, etc.) The external user interface 606 may comprise a computer, workstation, personal computer, palm computer, web user interface, proprietary user interface, or any other device capable of providing a user interface for the storage drives 506a . . . 506k.

The decryption unit 102 and I/O manager code 602 may be implemented as hardware logic in the storage drive 600 or in computer executable instructions that are accessed and executed by a processor (not shown) in the storage drive 600. In certain embodiments the storage drive 600 is a tape drive.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip. Programmable Gate Array (PGA), Application Specific Integrated Circuit (ASIC), etc.] or a computer readable medium, such as magnetic storage medium (e.g., hard disk drive, floppy disk, tape, etc.), optical storage (CD-ROM, optical disk, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in certain operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
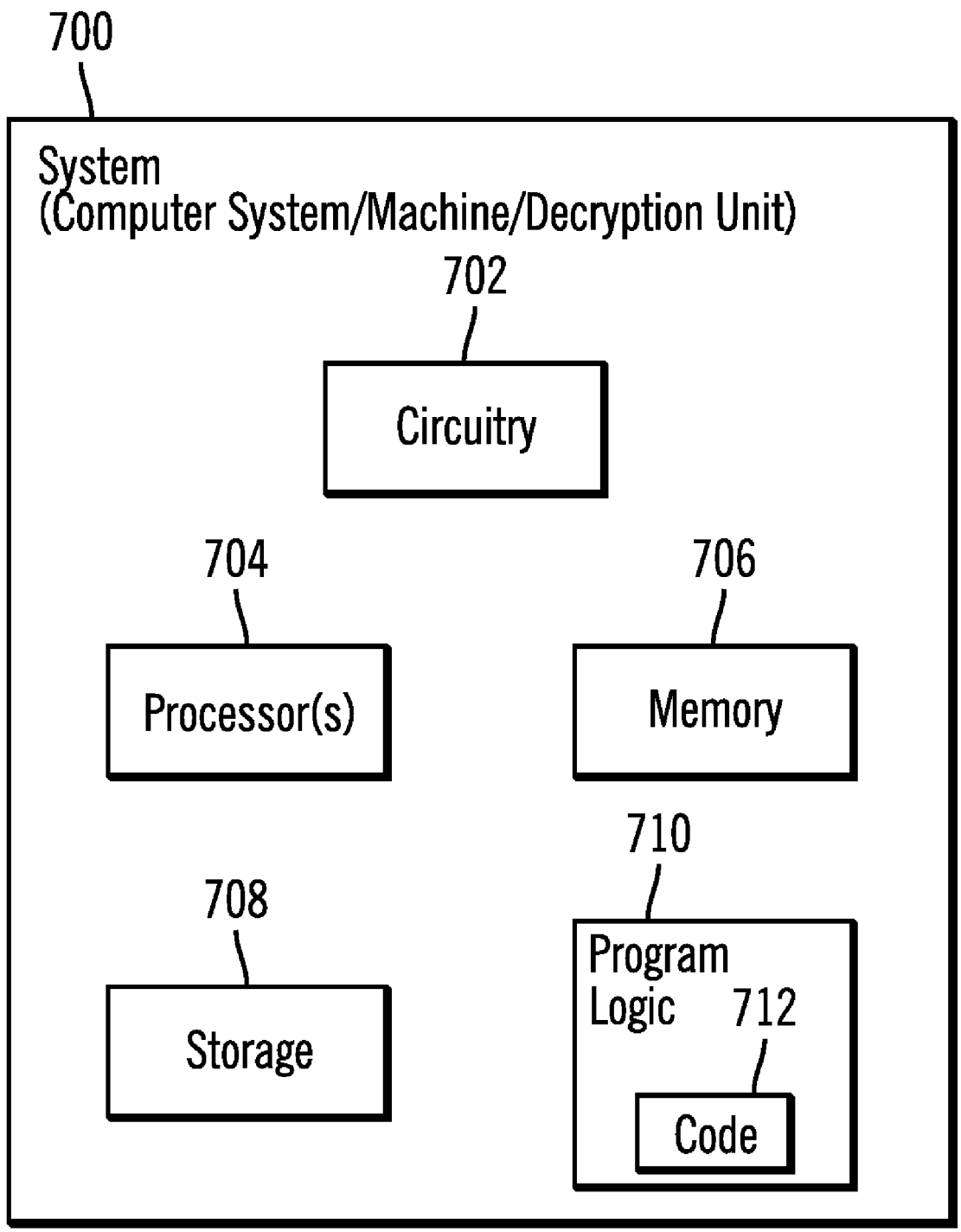
FIG. 7 illustrates the architecture of computing system, wherein in certain embodiments elements of the computing environment of FIG. 1 may be implemented in accordance with the architecture of the computing system.

FIG. 7 illustrates an exemplary computer system 700, wherein in certain embodiments the decryption unit 102 of the computing environment 100 of FIG. 1 may be implemented in accordance with the computer architecture of the computer system 700. The computer system 700 may also be referred to as a system, and may include a circuitry 702 that may in certain embodiments include a processor 704. The system 700 may also include a memory 706 (e.g., a volatile memory device), and storage 708. Certain elements of the system 700 may or may not be found in the decryption unit 102 of FIG. 1. The storage 708 may include a non-voltage memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed towards a method for deploying computing infrastructure by a person or via automated processing. Certain other embodiments may be directed towards integrating computer-readable code into a computing system, wherein the code in combination with the computing system is enabled to perform the operations described earlier.

At least certain of the operations illustrated in FIG. 3 nay be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

*IEEE P1619.1 is a trademark or registered trademark of Institute of Electrical and Electronics Engineers, Inc.

What is claimed is:

1. A method, comprising:

maintaining, at a decryption unit implemented in a tape drive, an expected key identifier, an expected initialization vector, a mask register, and an accept line, wherein the number of bits of the mask register equals a sum of the number of bits in the expected key identifier and the number of bits in the expected initialization vector;

receiving, at the decryption unit, a key identifier and an initialization vector, wherein a plurality of encrypted data records stored in a tape that is within a tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable by the decryption unit from the key identifier;

turning off the accept line at the decryption unit, wherein turning off the accept line prevents the plurality of encrypted data records of the data stream from being received by the decryption unit;

in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

2. The method of claim 1, wherein the reading of the plurality of encrypted data records of the data stream is delayed by the decryption unit, if the received key identifier does not match the expected key identifier at the decryption unit.

3. The method of claim 2, the method further comprising:

replacing, at the decryption unit, the expected key identifier with a new expected key identifier, in response to determining that the received key identifier does not match the expected key identifier; and determining, at the decryption unit, whether the new expected key identifier matches the received key identifier.

4. The method of claim 1, the method further comprising:

reading a first encrypted data record of the plurality of encrypted data records;

decrypting the first encrypted data record of the plurality of encrypted data records by using a counter value generated from the initialization vector and the cryptographic key recovered from the expected key identifier; and reading additional encrypted data records of the plurality of encrypted data records for decryption.

5. A decryption unit implemented in a tape drive, comprising:

memory; and processor coupled to the memory, wherein the processor performs operations, the operations comprising:

(i) maintaining an expected key identifier, an expected initialization vector, a mask register, and an accept line, wherein the number of bits of the mask register equals a sum of the number of bits in the expected key identifier and the number of bits in the expected initialization vector;

(ii) receiving a key identifier and an initialization vector, wherein a plurality of encrypted data records stored in a tape that is within a tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable from the key identifier;

(iii) turning off the accept line at the decryption unit, wherein turning off the accept line prevents the plurality of encrypted data records of the data stream from being received by the decryption unit;

(iv) in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and (v) in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

6. The decryption unit of claim 5, wherein the reading of the plurality of encrypted data records of the data stream is delayed, if the received key identifier does not match the expected key identifier.

7. The decryption unit of claim 6, the operations further comprising:

replacing the expected key identifier with a new expected key identifier, in response to determining that the received key identifier does not match the expected key identifier; and determining whether the new expected key identifier matches the received key identifier.

8. The decryption unit of claim 5, the operations further comprising:

reading a first encrypted data record of the plurality of encrypted data records;

decrypting the first encrypted data record of the plurality of encrypted data records by using a counter value generated from the initialization vector and the cryptographic key recovered from the expected key identifier; and reading additional encrypted data records of the plurality of encrypted data records for decryption.

9. An article of manufacture comprising hardware or a combination of hardware and software, wherein the article of manufacture includes machine readable instructions, wherein the machine readable instructions cause operations on a machine comprising a decryption unit, the operations comprising:

maintaining, at the decryption unit implemented in a tape drive, an expected key identifier, an expected initialization vector, a mask register, and an accept line, wherein the number of bits of the mask register equals a sum of the number of bits in the expected key identifier and the number of bits in the expected initialization vector;

receiving, at the decryption unit, a key identifier and an initialization vector, wherein a plurality of encrypted data records stored in a tape that is within a tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable by the decryption unit from the key identifier;

turning off the accept line at the decryption unit, wherein turning off the accept line prevents the plurality of encrypted data records of the data stream from being received by the decryption unit;

in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

10. The article of manufacture of claim 9, wherein the reading of the plurality of encrypted data records of the data stream is delayed by the decryption unit, if the received key identifier does not match the expected key identifier at the decryption unit.

11. The article of manufacture of claim 10, the operations further comprising:

replacing, at the decryption unit, the expected key identifier with a new expected key identifier, in response to determining that the received key identifier does not match the expected key identifier; and determining, at the decryption unit, whether the new expected key identifier matches the received key identifier.

12. The article of manufacture of claim 9, the operations further comprising:

reading a first encrypted data record of the plurality of encrypted data records;

decrypting the first encrypted data record of the plurality of encrypted data records by using a counter value generated from the initialization vector and the cryptographic key recovered from the expected key identifier; and reading additional encrypted data records of the plurality of encrypted data records for decryption.

13. A method for deploying computing infrastructure, comprising integrating machine-readable code into a machine comprising a decryption unit, wherein the code in combination with the machine is capable of performing:

maintaining, at the decryption unit implemented in a tape drive, an expected key identifier, an expected initialization vector, a mask register, and an accept line, wherein the number of bits of the mask register equals a sum of the number of bits in the expected key identifier and the number of bits in the expected initialization vector;

receiving, at the decryption unit, a key identifier and an initialization vector, wherein a plurality of encrypted data records stored in a tape that is within a tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable by the decryption unit from the key identifier;

turning off the accept line at the decryption unit, wherein turning off the accept line prevents the plurality of encrypted data records of the data stream from being received by the decryption unit;

in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

14. The method for deploying computing infrastructure of claim 13, wherein the reading of the plurality of encrypted data records of the data stream is delayed by the decryption unit, if the received key identifier does not match the expected key identifier at the decryption unit.

15. The method for deploying computing infrastructure of claim 14, wherein the code in combination with the machine is further capable of performing:

replacing, at the decryption unit, the expected key identifier with a new expected key identifier, in response to determining that the received key identifier does not match the expected key identifier; and determining, at the decryption unit, whether the new expected key identifier matches the received key identifier.

16. The method for deploying computing infrastructure of claim 13, wherein the code in combination with the machine is further capable of performing:

reading a first encrypted data record of the plurality of encrypted data records;

decrypting the first encrypted data record of the plurality of encrypted data records by using a counter value generated from the initialization vector and the cryptographic key recovered from the expected key identifier; and reading additional encrypted data records of the plurality of encrypted data records for decryption.

17. A tape library, comprising:

at least one tape drive; and at least one decryption unit implemented in the at least one tape drive, wherein the at least one decryption unit performs:

(i) maintaining an expected key identifier, an expected initialization vector, a mask register, and an accept line, wherein the number of bits of the mask register equals a sum of the number of bits in the expected key identifier and the number of bits in the expected initialization vector;

(ii) receiving a key identifier and an initialization vector, wherein a plurality of encrypted data records stored in a tape that is within the tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable by the at least one decryption unit from the key identifier;

(iii) turning off the accept line at the decryption unit, wherein turning off the accept line prevents the plurality of encrypted data records of the data stream from being received by the decryption unit;

(iv) in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and (v) in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

18. The tape library of claim 17, wherein the reading of the plurality of encrypted data records of the data stream is delayed by the at least one decryption unit, if the received key identifier does not match the expected key identifier at the at least one decryption unit.

19. A tape drive, comprising:

removable storage medium comprising at least a tape; and at least one decryption unit coupled to the removable storage medium, wherein the at least one decryption unit performs:

(i) maintaining an expected key identifier, an expected initialization vector, a mask register, and an accept line, wherein the number of bits of the mask register equals a sum of the number of bits in the expected key identifier and the number of bits in the expected initialization vector;

(ii) receiving a key identifier and an initialization vector, wherein a plurality of encrypted data records stored in the tape that is within a tape library having a library controller and an autochanger mechanism configured to transfer the tape to the tape drive are preceded by the key identifier and the initialization vector in a data stream, wherein the plurality of encrypted data records are succeeded by a message authentication code in the data stream, and wherein the plurality of encrypted data records have been encrypted with a cryptographic key that is recoverable from the key identifier;

(iii) turning off the accept line at the decryption unit, wherein turning off the accept line prevents the plurality of encrypted data records of the data stream from being received by the decryption unit;

(iv) in response to turning off the accept line at the decryption unit, and in response to determining that the received key identifier matches the expected key identifier at least at a first plurality of bits indicated in the mask register and that the received initialization vector matches the expected initialization vector at least at a second plurality of bits indicated in the mask register, turning on the accept line at the decryption unit, wherein turning on the accept line allows the plurality of encrypted data records of the data stream to be received by the decryption unit to be read by the decryption unit; and (v) in response to turning off the accept line at the decryption unit, and in response to determining that the received key identifier does not match the expected key identifier at least at the first plurality of bits indicated in the mask register or that the received initialization vector does not match the expected initialization vector at least at the second plurality of bits indicated in the mask register, setting an error bit at the decryption unit and maintaining the accept line as turned off.

20. The tape drive of claim 19, wherein the reading of the plurality of encrypted data records of the data stream is delayed by the at least one decryption unit, if the received key identifier does not match the expected key identifier at the at least one decryption unit.

* * * * *